United States Patent
Berman et al.

(10) Patent No.: US 12,205,363 B2
(45) Date of Patent: Jan. 21, 2025

(54) COMPUTER VISION MODEL DRAWING INTERFACE

(71) Applicant: Rockwell Automation Technologies, Inc., Mayfield Heights, OH (US)

(72) Inventors: Alexander Berman, Austin, TX (US); Bijan SayyarRodsari, Austin, TX (US); Wei Dai, Austin, TX (US); Kadir Liano, Pflugerville, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 393 days.

(21) Appl. No.: 17/817,611

(22) Filed: Aug. 4, 2022

(65) Prior Publication Data
US 2024/0046634 A1 Feb. 8, 2024

(51) Int. Cl.
*G06V 10/00* (2022.01)
*G06V 10/22* (2022.01)
(Continued)

(52) U.S. Cl.
CPC .......... *G06V 10/945* (2022.01); *G06V 10/225* (2022.01); *G06V 10/751* (2022.01);
(Continued)

(58) Field of Classification Search
CPC .. G06N 3/08; G06N 3/04; G06N 3/02; G06N 3/042; G06N 3/045; G06N 3/047;
(Continued)

(56) References Cited

U.S. PATENT DOCUMENTS

| | | | | |
|---|---|---|---|---|
| 5,568,566 A | * | 10/1996 | Hori | G06V 30/422 382/113 |
| 7,321,370 B2 | * | 1/2008 | Ishiyama | G06V 10/758 345/607 |

(Continued)

FOREIGN PATENT DOCUMENTS

WO    WO-2022/125453 A1    6/2022

OTHER PUBLICATIONS

EP Search Report for EP Application No. 23183323.7, dated Dec. 18, 2023.
(Continued)

*Primary Examiner* — Amir Alavi
(74) *Attorney, Agent, or Firm* — Foley & Lardner LLP

(57) ABSTRACT

For updating a computer vision model, a method converts a user input drawing including a user annotation of a first image in a drawing format to a training format image in a training format for a computer vision model. The method generates a training-representation drawing from the training format image. The training-representation drawing includes an image inference for the first image. The method receives user feedback for the training-representation drawing in the drawing format. The method updates the computer vision model based on the user feedback. The method generates an image inference for a second image based on the updated computer vision model and generates model-health metrics, agreement-metrics, and a sortable image index to explain image inferences with respect to guided user annotation of the second image. The method caches partial results from the image-inferences to afford quicker updating of computer vision models, affording more iterative model-development than ad-hoc model-evaluation.

20 Claims, 25 Drawing Sheets

(51) Int. Cl.
  *G06V 10/75* (2022.01)
  *G06V 10/774* (2022.01)
  *G06V 10/776* (2022.01)
  *G06V 10/94* (2022.01)
  *G06V 10/82* (2022.01)

(52) U.S. Cl.
  CPC .......... *G06V 10/774* (2022.01); *G06V 10/776* (2022.01); *G06V 10/82* (2022.01)

(58) Field of Classification Search
  CPC ........ G06N 3/049; G06N 3/082; G06N 3/092; G06N 3/0475; G06N 3/0454; G06N 3/0464; G06N 5/041; G06V 10/945; G06V 10/82; G06V 10/751; G06V 10/761; G06V 10/774; G06V 10/776; G06V 10/225
  See application file for complete search history.

(56) References Cited

U.S. PATENT DOCUMENTS

| | | | | |
|---|---|---|---|---|
| 8,429,174 | B2* | 4/2013 | Ramani | G06V 20/64 |
| | | | | 345/473 |
| 8,543,902 | B2* | 9/2013 | Algreatly | G06F 3/04845 |
| | | | | 382/307 |
| 8,682,107 | B2* | 3/2014 | Yoon | H04N 13/261 |
| | | | | 382/154 |
| 10,521,700 | B2* | 12/2019 | Murrish | G06N 3/047 |
| 11,036,976 | B2* | 6/2021 | Mirjan | B07C 3/14 |
| 11,341,627 | B2* | 5/2022 | Sarkisian | G06T 7/0004 |
| 11,487,299 | B2* | 11/2022 | Sarkar | G06V 20/59 |
| 11,599,689 | B2* | 3/2023 | Morczinek | G06F 18/29 |
| 2020/0151923 | A1* | 5/2020 | Bergin | G06T 17/10 |
| 2024/0046634 | A1* | 2/2024 | Berman | G06V 10/776 |

OTHER PUBLICATIONS

Kim, T., et al., "Product Inspection Methodology via Deep Learning: An Overview," Mar. 30, 2021, pp. 1-13.

Waseem, F., et al., "VizInspect Pro-Automated Optical Inspection (AOI) solution", Cornell University Library, 201 Olin Library Cornell University, Ithaca, NY 14853, May 26, 2022, pp. 1-9.

Yang, H., et al., "Autolabeling-Enhanced Active Learning for Cost-Efficient Surface Defect Visual Classification", IEEE Transactions on Instrumentation and Measurement, IEEE, USA, vol. 70, Oct. 19, 2020, pp. 1-15.

* cited by examiner

291

| Image 201 | Image Inference 211 | User Feedback 251 |
|---|---|---|
| Image 201 | Image Inference 211 | User Feedback 251 |
| ... | ... | ... |
| Image 201 | Image Inference 211 | User Feedback 251 |

Training Data Emphasizes that User Feedback in some form is used to train the model.

293

| Process Information 295 | Image 201 | Image Inference 211 |
|---|---|---|
| Process Information 295 | Image 201 | Image Inference 211 |
| ... | ... | ... |
| Process Information 295 | Image 201 | Image Inference 211 |

290

| Model Health 237 |
|--- |
| User Consistency 239 |
| Agreement Score 241 |
| Target Model Health Range 243 |
| Comparison 245 |
| Process Condition 247 |

COMPUTER VISION MODEL DRAWING INTERFACE

BACKGROUND INFORMATION

The subject matter disclosed herein relates to computer vision models and a drawing interface for annotating images to train computer vision models.

BRIEF DESCRIPTION

A method for updating a computer vision model is disclosed. The method converts a user input drawing comprising a user annotation of a first image in a drawing format to a training format image in a training format for a computer vision model. The method generates a training-representation drawing from the training format image, the training-representation drawing comprising an image inference for the first image. The method receives user feedback for the training-representation drawing in the drawing format. The method updates the computer vision model based on the user feedback. The method generates an image inference for a second image based on the updated computer vision model.

An apparatus for updating a computer vision model is disclosed. The apparatus includes a processor executing code stored in memory. The processor converts a user input drawing comprising a user annotation of a first image in a drawing format to a training format image in a training format for a computer vision model. The processor generates a training-representation drawing from the training format image, the training-representation drawing comprising an image inference for the first image. The processor receives user feedback for the training-representation drawing in the drawing format. The processor updates the computer vision model based on the user feedback. The processor generates an image inference for a second image based on the updated computer vision model.

A computer program product for updating a computer vision model is disclosed. The computer program product includes a non-transitory computer readable storage medium having program code embodied therein, the program code readable/executable by a processor. The processor converts a user input drawing comprising a user annotation of a first image in a drawing format to a training format image in a training format for a computer vision model. The processor generates a training-representation drawing from the training format image, the training-representation drawing comprising an image inference for the first image. The processor receives user feedback for the training-representation drawing in the drawing format. The processor updates the computer vision model based on the user feedback. The processor generates an image inference for a second image based on the updated computer vision model.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
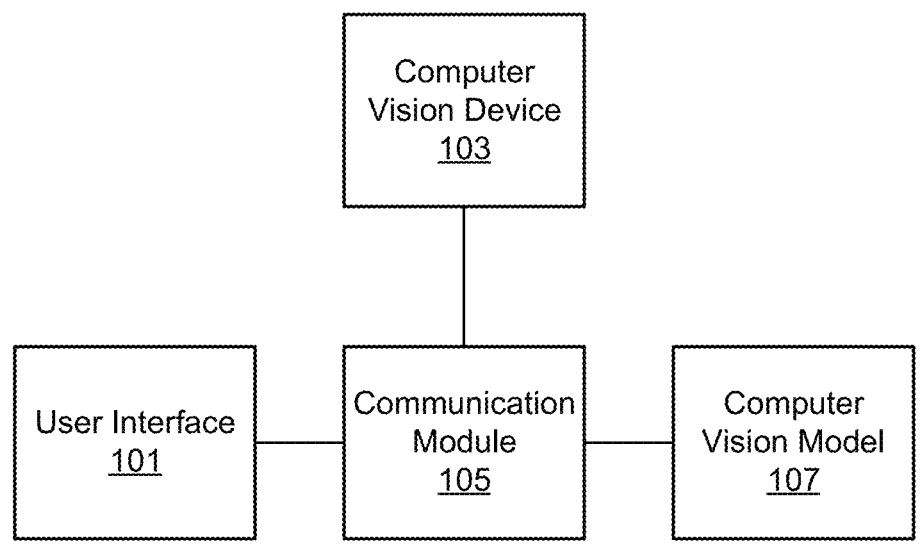
FIG. 1A is a schematic block diagram of computer vision system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

Program code for carrying out operations for aspects of the present invention may be written in any combination of one or more programming languages, including an object-oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1A is a schematic block diagram of computer vision system 100. The computer vision system 100 may inspect automation equipment. In addition, the computer vision system 100 may inspect work in progress parts, finished parts, and the like. In the depicted embodiment, the computer vision system 100 includes a user interface 101, the communication module 105, a computer vision device 103, and a computer vision model 107.

The communication module 105 may facilitate communications between the user interface 101, the computer vision device 103, and the computer vision model 107. The communication module 105, may comprise networks including wireless networks and wired networks, servers, and the like. The communication module 105 may be configured as a network.

The computer vision device 103 may capture images of the automation equipment, the work in process parts, and/or the finished parts. The computer vision device 103 may be configured as a computer and/or an edge device in a network.

The computer vision model 107 may be trained to identify component wear, failure scenarios, process errors, part nonconformities, and the like from the images captured by the computer vision device 103.

The user interface 101 may present the images and other information including image inferences from the computer vision model 107 to the user. Unfortunately, a presented image may include an inaccurate and/or suboptimal identification of features in the image and/or predictions for the image component. In the past, improving the training of the computer vision module 107 was difficult, and may have been delayed by the training process before presenting these inaccurate and/or suboptimal features to the user. As a result, needed updates to the computer vision model 107 were difficult to implement.

The embodiments described herein allow a user to update the computer vision module 107 by creating a user input drawing on a presented image. The user input drawing may consist of free-hand pen/brush and shape tools to add or subtract a pixel mask to a training image representation, either directly or through assistance via the AI models or traditional computer vision tools. The user input drawing consists of an image of the same size as the first input image, where each pixel is a single bit designating whether an instance of a particular classification is represented or not represented. The first image can contain no input or user input drawing image representations, designating multiple classifications and instances of these classifications. The embodiments may convert the user input image to a training format image in a training format for the computer vision model 107. The embodiments may further generate a training-representation drawing from the training format image and receive user feedback for the training-representation drawing. The embodiments may update the computer vision model 107 based on the user feedback to rapidly improve the efficacy of the computer vision model 107. As a result, the performance of the computer vision system 100 is improved.

Figure 1B:
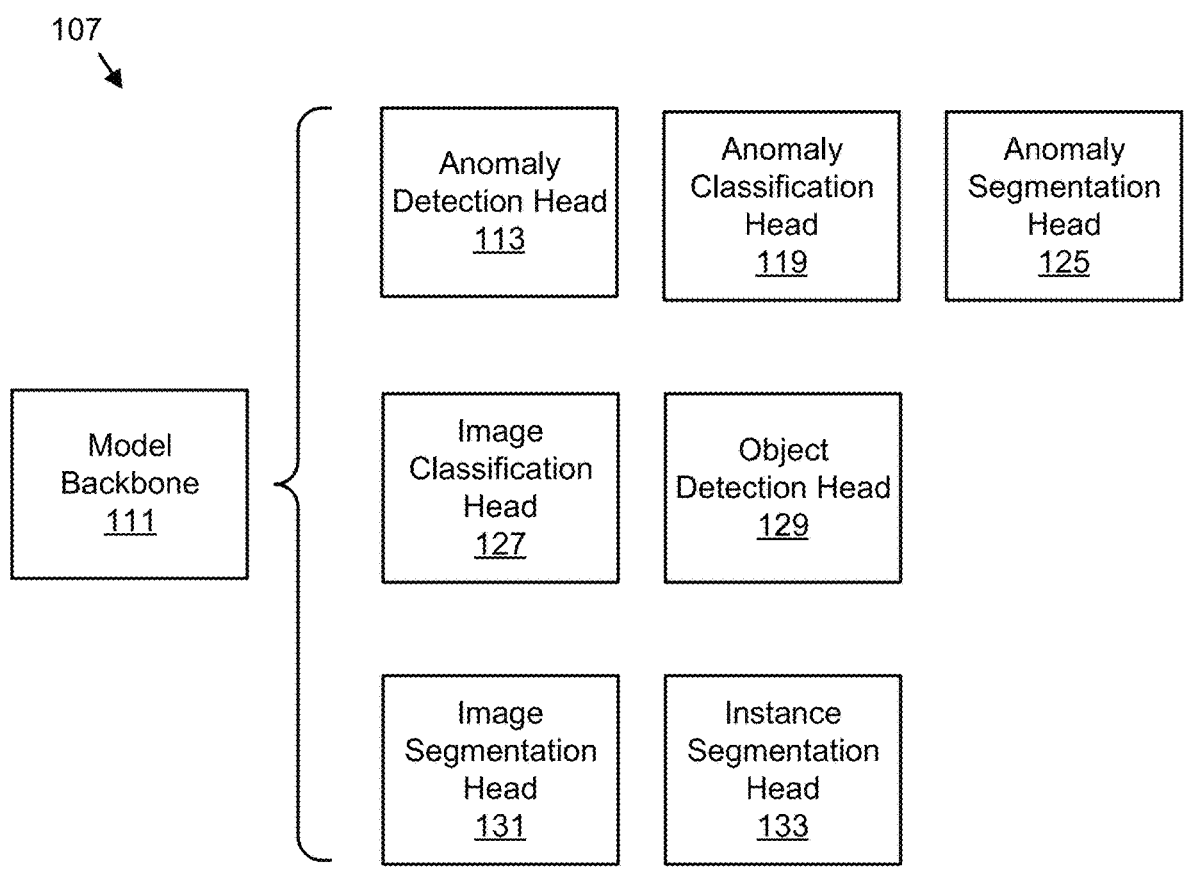
FIG. 1B is a schematic block diagram of computer vision model according to an embodiment.

FIG. 1B is a schematic block diagram of the computer vision model 107. In the depicted embodiment, the computer vision model 107 employs a modular algorithm architecture for switching between different vision tasks. The computer vision model 107 may include a model backbone 111, an anomaly detection head 113, an anomaly classification head 119, an anomaly segmentation head 125, an image classification head 127, an object detection head 129, an image segmentation head 131, and an instance segmentation head 133. As used herein, a head is a top of a network that consists of neural networks and/or statistical models. The model backbone 111 may perform computer vision functions to extract numerical features from any given image 201. The anomaly classification head 119 may detect the presence of a class in images 201. The anomaly segmentation head 125 may be used to detect anomalies' pixel locations within images 201. The image classification head 127 may be used to detect the presence of a class in images 201. The object detection head 129 may be used to detect the presence of a class, the number of class instances, and the general location via position and size of a box encompassing each class instance. The image segmentation head 131 may be used to detect the presence of a class and specify all pixels in images 201 as belonging to one of many classifications. The instance segmentation head 133 may be used to detect the presence of a class, the number of instances per classification, and the exact pixels in the images 201 for each instance where the same pixels may belong to multiple instance.

The computer vision model 107 may use the model backbone 111 from either a transfer-learning model or a meta-learning model using network weights from pre-training (e.g., unsupervised, self-supervised, or supervised) or using network weights from open-sourced model-weights such as a residual neural network (RESNET) trained on IMAGENET® database images. In a certain embodiment, no neural networks are trained. Instead, output of networks trained on open-source weights to inform a statistical model used for predictions such as inference. Meta-learning approaches applied by some inference heads may be much more lightweight to train and so may be done in minutes or faster on an edge device such as a computer. In one embodiment, the user may have the option to disable automatic retraining on annotation-updates to favor more intense training pipelines that will take more computation to complete such as on-device or on an external training machine.

Figure 1C:
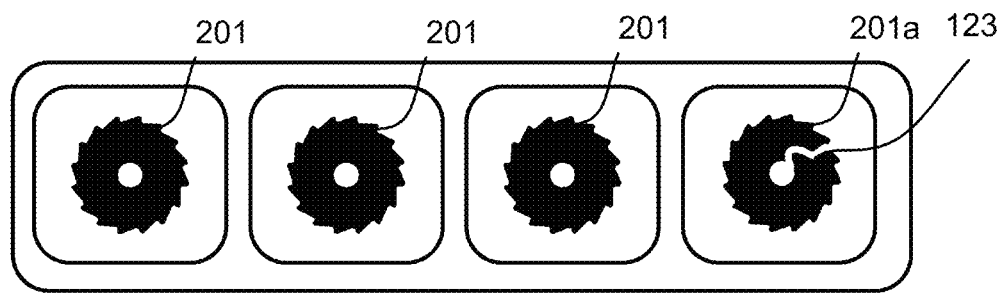
FIG. 1C is a drawing of images according to an embodiment.

FIG. 1C is a drawing of images 201. The images 201 may be presented to the user via a user interface. In the depicted embodiment, images 201 of a saw blade are presented. A first image 201a includes an image annotation 123. The image annotation 123 may emphasize a feature, prediction, characteristic, or the like of the image 201. In the depicted embodiment, the image annotation 123 indicates a potential crack.

Figure 1D:
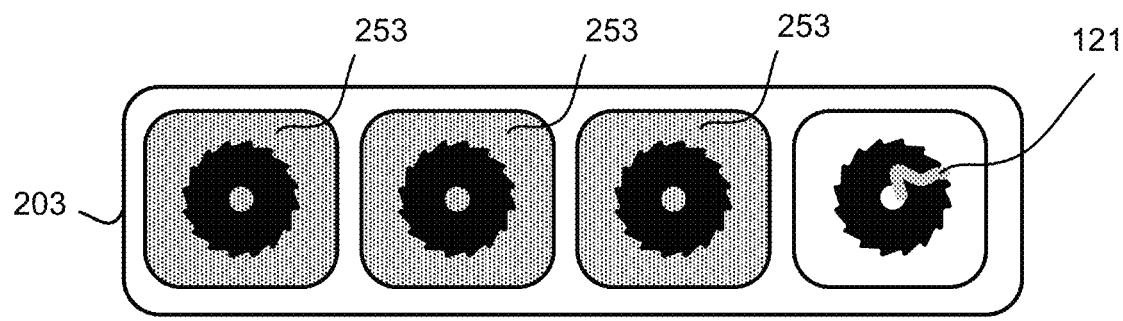
FIG. 1D is a drawing of user input drawings according to an embodiment.

FIG. 1D is a drawing of user input drawings 203. In the depicted embodiment, the images 201 of FIG. 1C are annotated with user feedback entered by the user via the user interface 101. The user feedback may be a clear indication 253 indicating that the user has no pixels of interest in image 201. In addition, a user annotation 121 may be added to the user input drawing 203. The user input drawing 203 may be converted to a training format image as will be described hereafter.

Figure 1E:
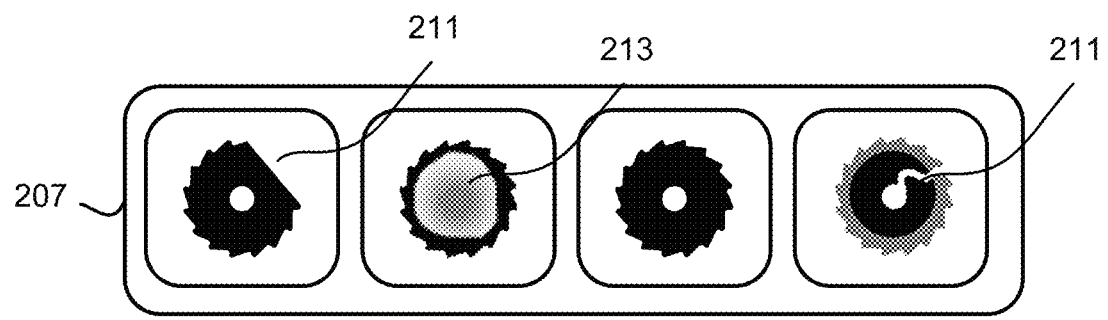
FIG. 1E is a drawing of training-representation drawings according to an embodiment.

FIG. 1E is a drawing of training-representation drawings 207. In the depicted embodiment, the user input drawings 203 of FIG. 1D that were converted to training format images 205 are generated as training-representation drawings 207. The training-representation drawings 207 may include image inferences 211 and/or saliency maps 213.

The image inference 211 may comprise a pixel map agreement metric that highlights commonly marked and differently marked pixels in the user annotation 121 and image annotations 123, pixel percentage metrics that compare the commonly marked and differently marked pixels in the user annotation 121 and image annotations 123, and a comparison heatmap metric that shows the sums of the commonly marked and differently marked pixels over regions.

For example, if the user annotation 121 and the image annotation 123 differ by a set of X pixels while having a set of Y pixels in common, the pixel percentage metric PPM may be calculated using Equations 1-3, $$PPM = \frac{Y}{X+Y} \quad \text{Equation 1}$$

$$PPM = \frac{X}{X+Y} \quad \text{Equation 2}$$

$$PPM = \frac{|X-Y|}{X+Y} \quad \text{Equation 3}$$

The pixel map agreement metric may highlight the set of X pixels with a first color and the set of Y pixels with a second color.

In one embodiment, the comparison heatmap metric CHM is calculated for each pixel using Equation 4, where X(x, y) and Y(x, y) are specific pixels in the sets of X and Y pixels respectively.

$$CHM = |X(x,y) - Y(x,y)| \quad \text{Equation 4}$$

The saliency maps 213 may indicate areas of an image 201 that had the greatest influence on the model inference 211. For example, the saliency map 213 may alert a user to increased uncertainty and/or long-term trends. The saliency map 213 may also determine a type of uncertainty, such as novelty or noise. The image inference 211 and/or saliency maps 213 may be generated from the input of at least one user.

Figure 1F:
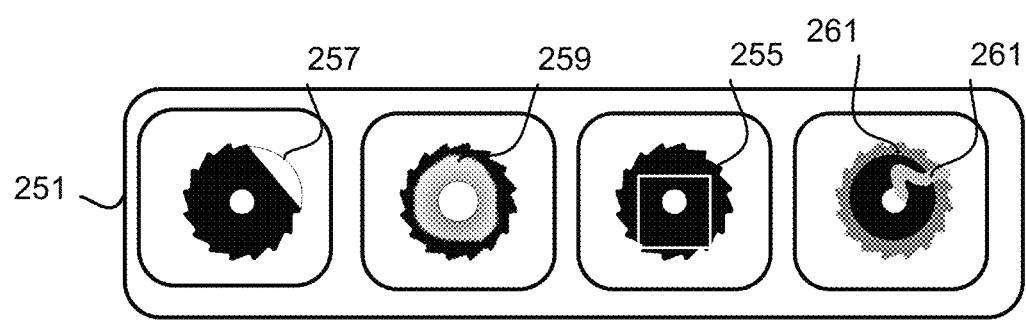
FIG. 1F is a drawing of user feedback according to an embodiment.

FIG. 1F is a drawing of user feedback 251 for the training-representation drawings 207 of FIG. 1E. in the depicted embodiment, the user feedback 251 includes annotation pixels 257, annotation colors 259, an annotation bounding box 255, and annotation layers 261. The user feedback 251 is generated from the user annotation 121. The user annotation 121 may be analyzed to determine agreement and/or disagreement with the image inferences 211 and/or saliency maps 213 presented in the training-representation drawings 207. The user feedback 251 may be used to train and/or update the computer vision model 107 as will be described hereafter.

Figure 2A:
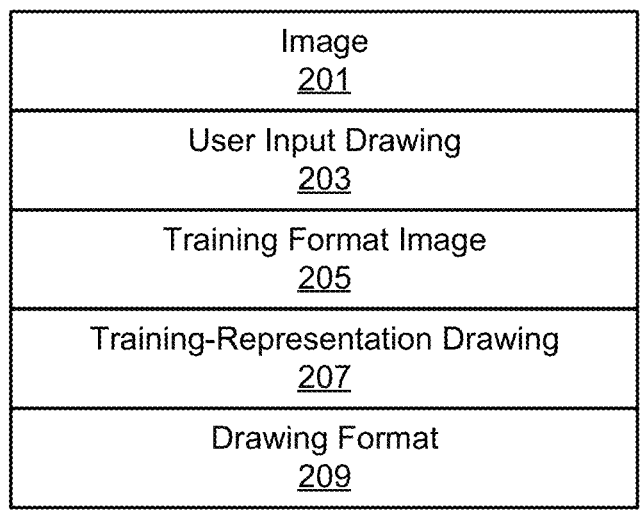
FIG. 2A is a schematic block diagram of image data according to an embodiment.

FIG. 2A is a schematic block diagram of image data 200 for an image 201. The image data 200 may be organized as a data structure in a memory. In the depicted embodiment, the image data 200 includes the image 201, the user input drawing 203, the training format image 205, the training-representation drawing 207, and a drawing format 209.

The image 201 may record the output of the computer vision device 103. The user input drawing 203 may include user annotations 121 and/or user feedback 251 added to the image 201 via a user interface 101. The user input drawing 203 may be in a format specified by the drawing format 209. The drawing format 209 consists of selected pixels via the user interface 101, which provides affordances for drawing free-hand, lines, boxes, circles, and other shapes with or without AI assistance. The training format image 205 may represent the user input drawing 203 in a training format for the computer vision model 107. The training-representation drawing 207 may be generated from the training format image 205.

In one embodiment, only a singular drawing interface is provided. As a result, a user need only learn the singular user interface 101. The embodiments may limit improper labeling via the user annotation 121, increasing the accuracy of feedback to the computer vision model 107. In a certain embodiment, high resolution and precise user annotation 121 is employed via a singular drawing interface.

In the past, when converting between inference/training tasks, like from object detection to segmentation, when labeling employed bounding boxes, the user would have to relabel the images from bounding boxes to a higher-precision pixel-wise mask for segmentation. Because the embodiment may force users to start using high-resolution pixel mask user annotations 121, user input is more consistent.

The user annotation 121 and the image annotation 123 share the drawing format 209. As a result, the embodiments can determine whether the computer vision model 107 is inferring classes and/or instances for the same reasons as the users are inferring classes and/or instances from the same images 201.

Figure 2B:
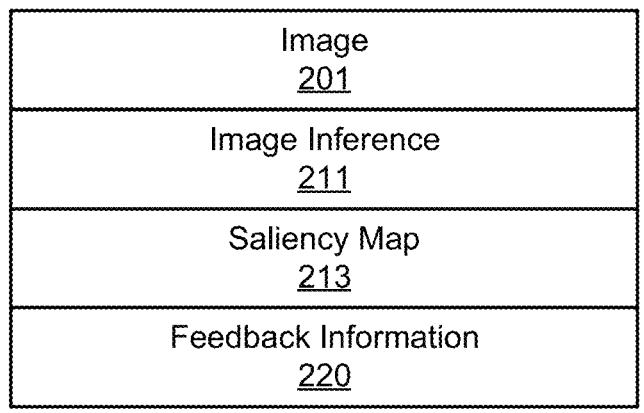
FIG. 2B is a schematic block diagram of training-representation drawing data according to an embodiment.

FIG. 2B is a schematic block diagram of training-representation drawing data 208 for the training-representation drawing 207. The training-representation drawing data 208 may be organized as a data structure in a memory. In the depicted embodiment, the training-representation drawing data 208 includes the image 201, an image inference 211, a saliency map 213, and feedback information 220. The feedback information 220 may comprise a classification of the image 201, the characterization of the image 201, and/or an anomaly in the image 201.

The use of high precision user annotation 121 improves the training-representation drawing data 208 and/or model data. In the past, differences identified by bounding boxes resulted in lower accuracy data. For example, two identical and overlapping bounding boxes each enclosing a spiral that does not intersect with the other spiral may have no shared pixels in their respective masks used for image segmentation. The use of high precision user annotation 121 thus increases the accuracy of the training-representation drawing data 208 and/or model data.

Figure 2C:
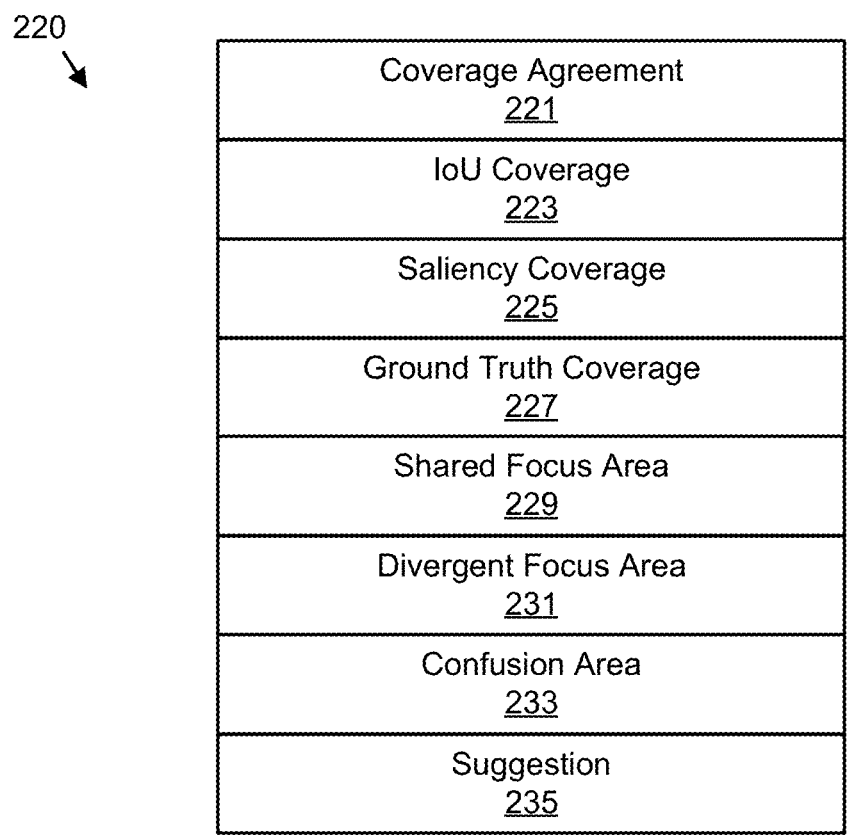
FIG. 2C is a schematic block diagram of feedback information according to an embodiment.

FIG. 2C is a schematic block diagram of the feedback information 220. In the depicted embodiment, the feedback information 220 includes at least one of a coverage agreement 221, an intersection over union (IoU) coverage 223, a saliency coverage 225, a ground truth coverage 227, a shared focus area 229, a divergent focus area 231, a confusion area 233, and a suggestion 235.

A coverage agreement 221 may indicate a percentage agreement and/or specific pixel agreement between at least two user annotations 121. The IoU coverage IoU 223 may be calculated using Equation 5, where S are pixels for an area of interest in a comparison drawing (user- or model-generated) and G are pixels for an area of interest in the image 201 from a user annotation.

$$IoU = \frac{|S \cap G|}{|S \cup G|} \quad \text{Equation 5}$$

The saliency coverage SC 225 may be calculated using Equation 6.

$$SC = \frac{|S \cap G|}{|S|} \quad \text{Equation 6}$$

The ground truth coverage GT 227 may be calculated using Equation 7.

$$GT = \frac{|S \cap G|}{|G|} \quad \text{Equation 7}$$

The shared focus area 229 may indicate areas of specific pixel agreement between the at least two user annotations 121. The shared focus area 229 may describe how user annotations 121 and image annotations 123 are similar or dissimilar and indicate what actions may be done by the user to improve the computer vision model 107. The divergent focus area 231 may indicate areas of no pixel agreement between the at least the user annotations 121. The confusion area 233 may indicate regions of some pixel agreement and no pixel agreement between the at least two user annotations 121. The suggestion 235 may record suggestions for improving an image inference 211 and are automatically generated and/or provided by a user.

A saliency map 213 may show whether the computer vision model 107 is inferring target classes/instances for the same reasons as the user.

Figure 2D:
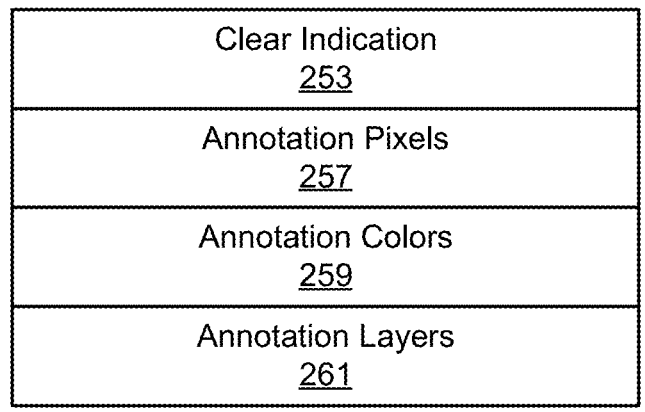
FIG. 2D is a schematic block diagram of user feedback according to an embodiment.

FIG. 2D is a schematic block diagram of the user feedback 251 illustrated in FIG. 1F. In the depicted embodiment, the user feedback 251 includes the annotation pixels 257, the annotation colors 259, and the annotation layers 261. The annotation layers 261 may group instances of user annotations 121. In addition, the annotation layers 261 may group classifications of user annotations 121. The groups may be of similar instances and/or classifications. In addition, the groups may be of different instances and/or classifications.

The clear indication 253 may be determined from a user annotation 121. In one embodiment, the clear indication 253 is determined from no user annotation 121 and/or minimal user annotations 121. The clear indication 253 may identify clear images 201 that help the computer vision model 107 to distinguish points of interest from background in images.

The clear indication 253 may be calculated to indicate selected pixel agreement between at least two user annotations 121.

Figure 2E:
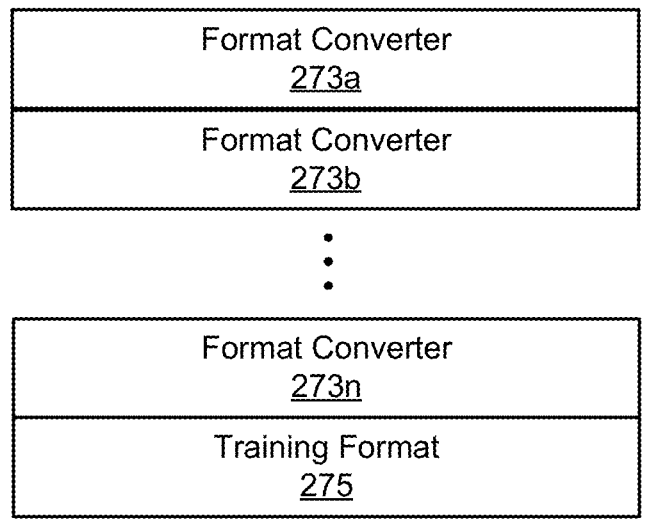
FIG. 2E is a schematic block diagram of format data according to an embodiment.

FIG. 2E is a schematic block diagram of format data 271. The format data 271 may be organized as a data structure in a memory. In the depicted embodiment, the format data 271 includes a plurality of format converters 273 and the training format 275. The training format 275 may specify at least one format for training data that is used to train the computer vision model 107. The format converters 273 may convert the user input drawing 203 to a training format image 205. The format converters 273 may also convert the user feedback 251 to a training format image 205. The format converters 273 may further convert the training format image 205 into the training-representation drawing 207.

Figure 2F:
FIG. 2F is a schematic block diagram of training data according to an embodiment.

FIG. 2F is a schematic block diagram of training data 291. The training data 291 is used to train the computer vision model 107. The training data 291 may be organized as a data structure in a memory. In the depicted embodiment, the training data 291 as one or more instances of an image 201, an image inference 211, and/or user feedback 251.

Figure 2G:
FIG. 2G is a schematic block diagram of process history according to an embodiment.

FIG. 2G is a schematic block diagram of process history 293. The process history 293 may be used to update the training data 291. In addition, the process history 293 may be used to train the computer vision model 107. The process history 293 may be organized as a data structure in a memory. In the depicted embodiment, the process history 293 includes process information 295, the image 201, and/or the image inference 211. The process information 205 may comprise operating times, operating intervals, operating conditions, part yields, failure rates, and the like for automation equipment.

In one embodiment, images are time stamped and properly aligned with other measurements available from a process (e.g., temperature, pressure, etc.). An algorithm (e.g., clustering algorithms) on process data can be used to identify a given state of the operation. The operation states (e.g., clusters) may be used to filter or sort images presented to the user for annotation. A distance measure that combines similarity between images and operation states can be utilized to help users filter and search through images to annotate, improving the computer vision model performance within pertinent operation states.

Figure 2H:
FIG. 2H is a schematic block diagram of model data according to an embodiment.

FIG. 2H is a schematic block diagram of model data 290. The model data 290 may be used to evaluate and/or improve the computer vision model 107. The model data 290 may be organized as a data structure in a memory. In the depicted embodiment, the model data 290 includes a model health 237, a user consistency 239, an agreement score 241, a target model health range 243, a comparison 245, and a process condition 247.

The comparison 245 may compare at least two sets of training-representation drawings 207, user input drawings 203, and/or corresponding feedback information 220. The user consistency 230 may be identified from the comparison 245. In one embodiment, the user consistency 230 comprises a percentage of consistent pixels and user annotations 121 between the at least two sets of training-representation drawings 207, user input drawings 203, and/or corresponding feedback information 220. The agreement score 241 may indicate an agreement between the user input drawings 203, image inferences 211, and/or corresponding feedback information 220.

The target model health range 243 may specify a target range for the model health 237. The model health 237 may indicate the certainty and/or efficacy of the computer vision model 107 using at least one parameter. The process condition 247 may be a failure condition, a part characteristic, an operational characteristic, a part failure characteristic, and the like.

Figure 3A:
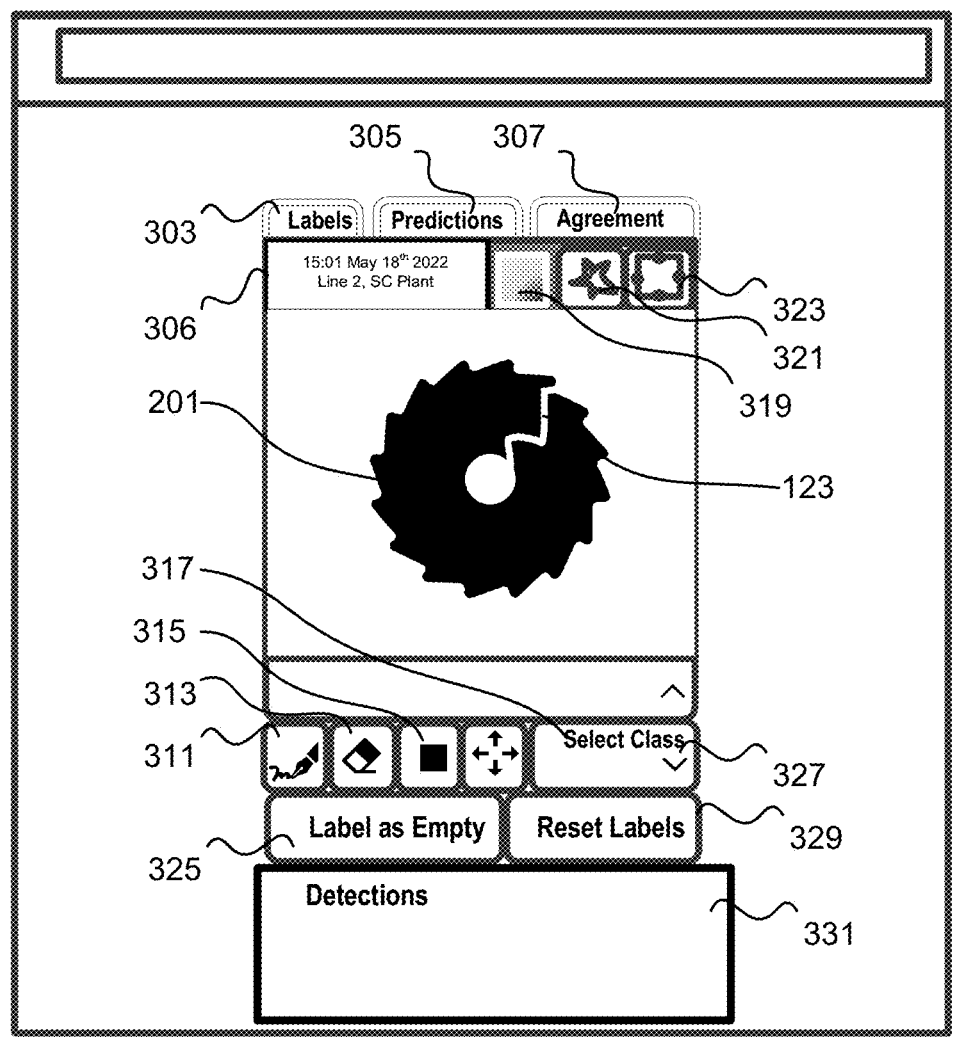
FIG. 3A is a drawing of a user interface according to an embodiment.

FIG. 3A is a drawing of a model user interface 300. The model user interface 300 may interact with a user via displays and input devices. The model user interface 300 presents the image 201 and/or image annotation 123. In addition, the model user interface 300 may present labels 303, predictions 305, agreement 307, metadata 306, an annotation color selector 319, an annotation pixel selector 321, and an annotation bounding box selector 323. Selecting labels 303 may present and/or add labels on the image 201. Predictions 305 may present predictions from the computer vision model 107. Agreement 307 may compare training-representation drawings 207, user input drawings 203, and/or corresponding feedback information 220. The annotation colors selector 319 may select annotation colors 259 for user input. The annotation pixels selector 321 may select annotation pixels 227 for user input 121. The annotation bounding box selector 323 may select a bounding box input.

The model user interface 300 may further include a draw selector 311, an erase selector 313, a fill selector 315, and a move selector 317. A select class selector 327 allows a class to be assigned to the image 201. A reset labels button 329 resets labels on the image 201. A label field 325 accepts a label for the image 201. A directions field 331 presents labeling advice, directions, and/or other information to the user.

Figure 3B:
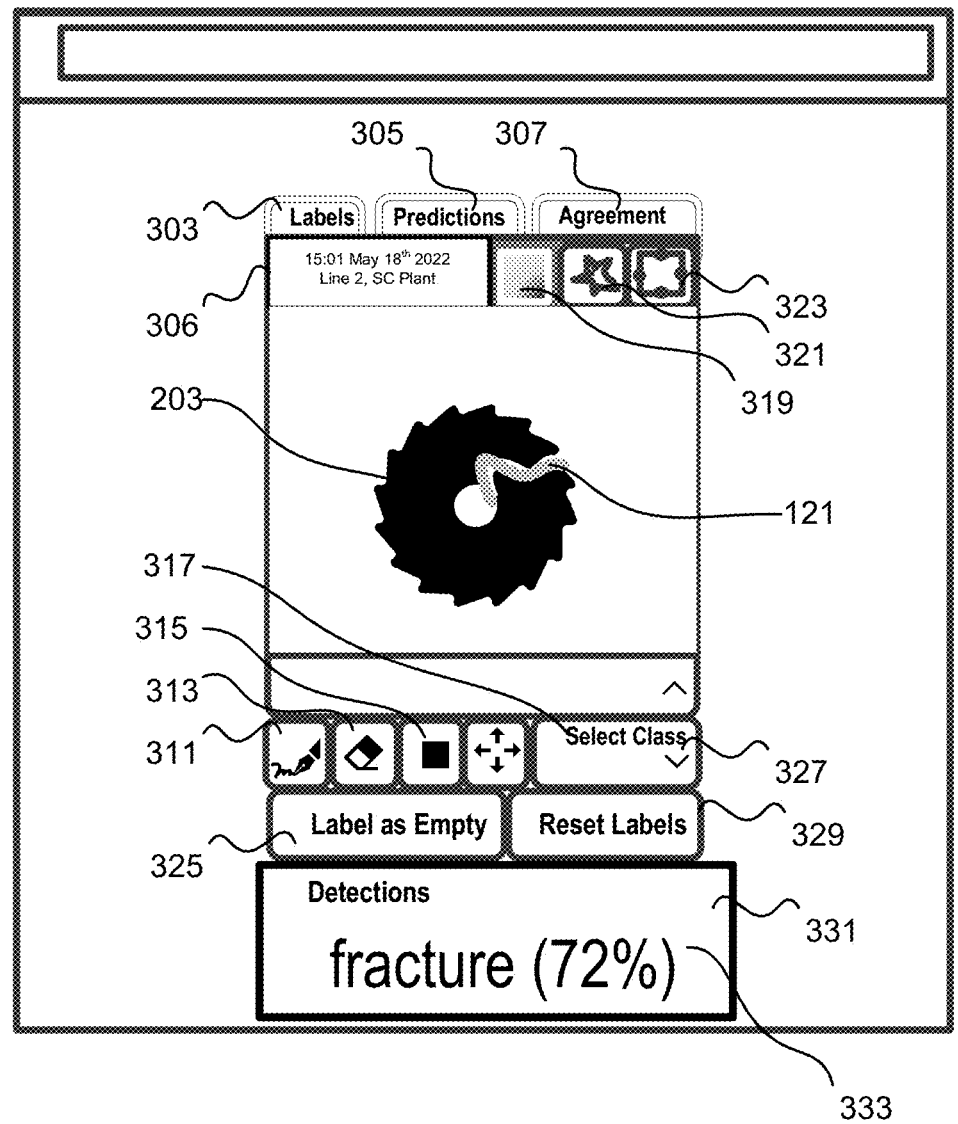
FIG. 3B is a drawing of a user interface according to an alternate embodiment.

FIG. 3B is a drawing of the model user interface 300 of FIG. 3B with the user annotation 121 added to form a user input drawing 203. In the depicted embodiment, the directions field 331 presents a fracture confidence 333.

Figure 3C:
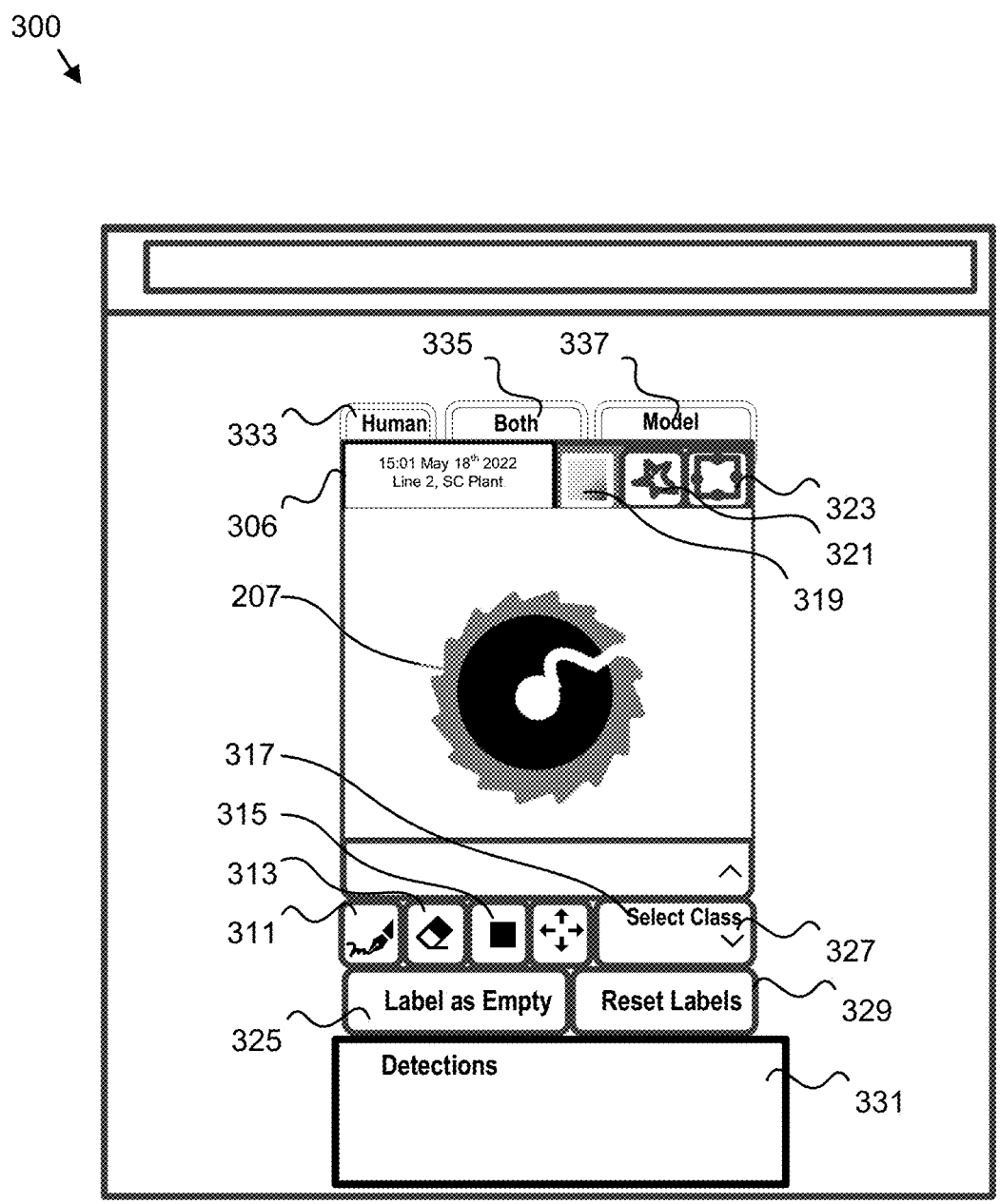
FIG. 3C is a drawing of a user interface according to an alternate embodiment.

FIG. 3C is a drawing of a model user interface 300. In the depicted embodiment, the model user interface 300 includes a human selector 333, a both selector 335, and a model selector 337. The human selector 333, both selector 335, and model selector 337 may be used to select presenting the user annotation 121, both the user annotation 121 and the image annotation 123, or the image annotation 123 respectively. In the depicted embodiment, a training-representation drawing 207 is presented to the user.

Figure 3D:
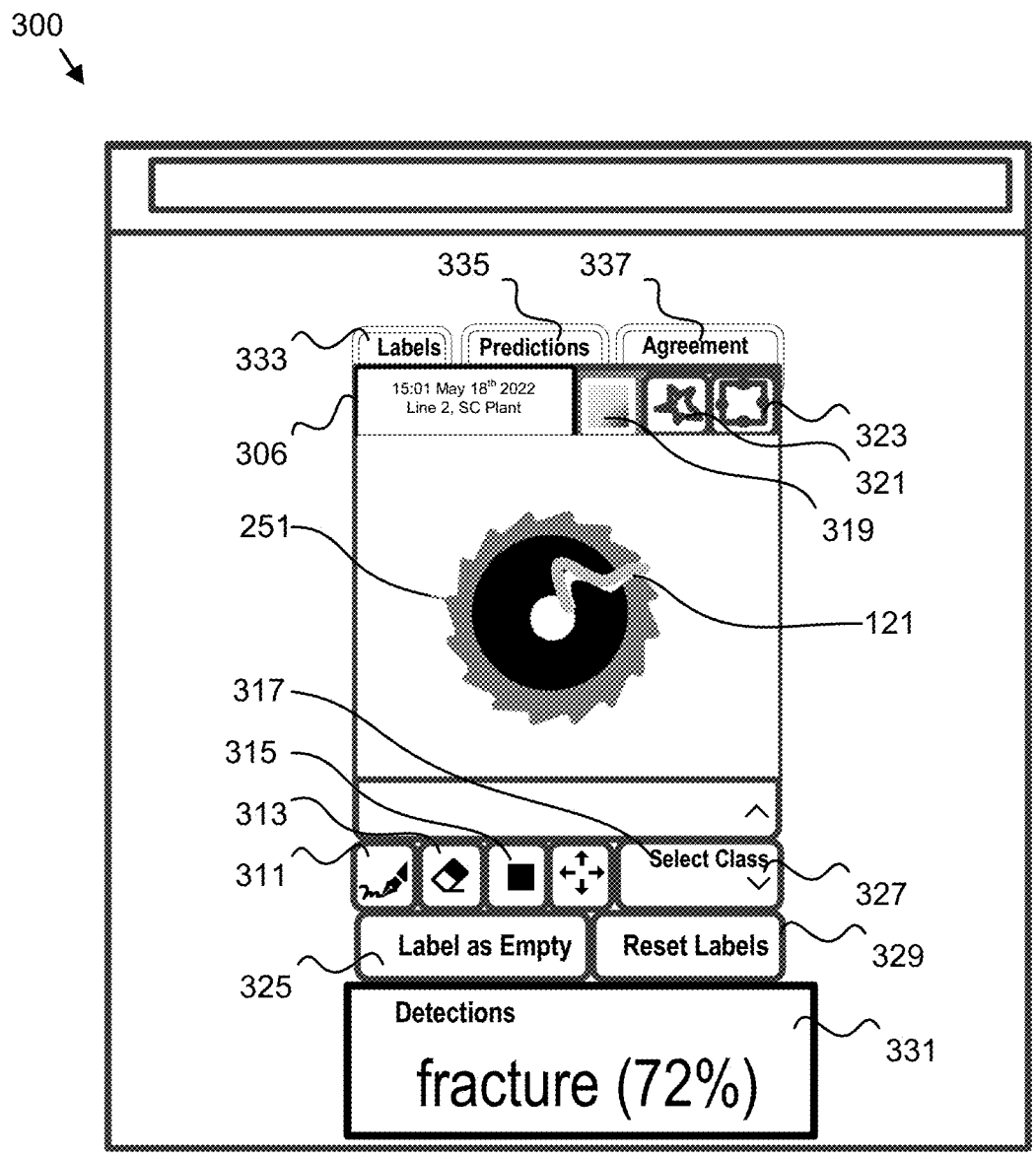
FIG. 3D is a drawing of a user interface according to an alternate embodiment.

FIG. 3D is a drawing of the model user interface 300 of FIG. 3C. In the depicted embodiment, the user annotation 121 is added to the training-representation drawing 207 to form user feedback 251.

Figure 3E:
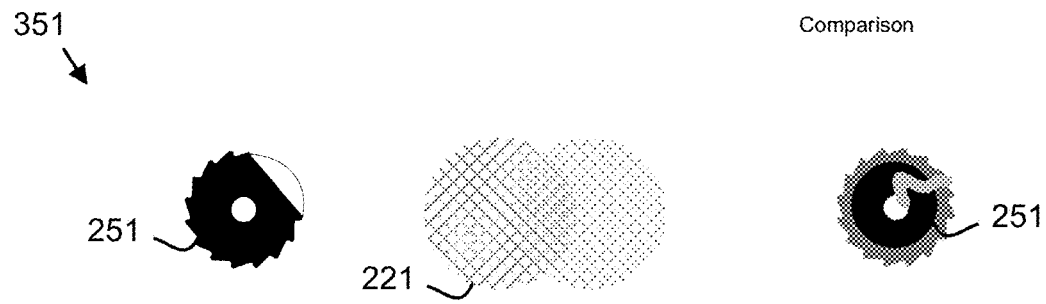
FIG. 3E is a drawing of a comparison presentation according to an alternate embodiment.

FIG. 3E is a drawing of a comparison presentation 351 of the comparison 245. In the depicted embodiment, user feedback 251 from two different users of one image 201 is presented along with coverage agreement 221 shown as a Venn diagram.

Figure 3F:
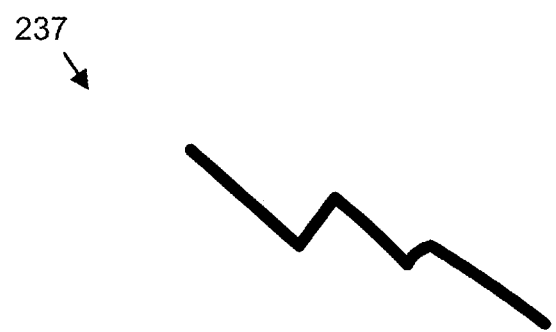
FIG. 3F is a drawing of a model health presentation according to an alternate embodiment.

FIG. 3F is a drawing of a model health presentation. The model health 237 is indicated is a graph over time.

Figure 3G:
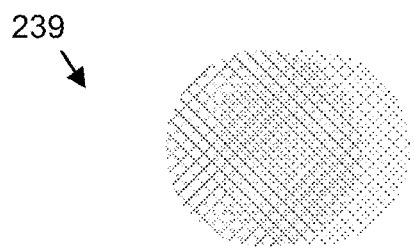
FIG. 3G is a drawing of a user consistency presentation according to an alternate embodiment.

FIG. 3G is a drawing of a user consistency presentation. The user consistency 239 is presented for the comparison 245 shown as a Venn diagram.

Figure 3H:
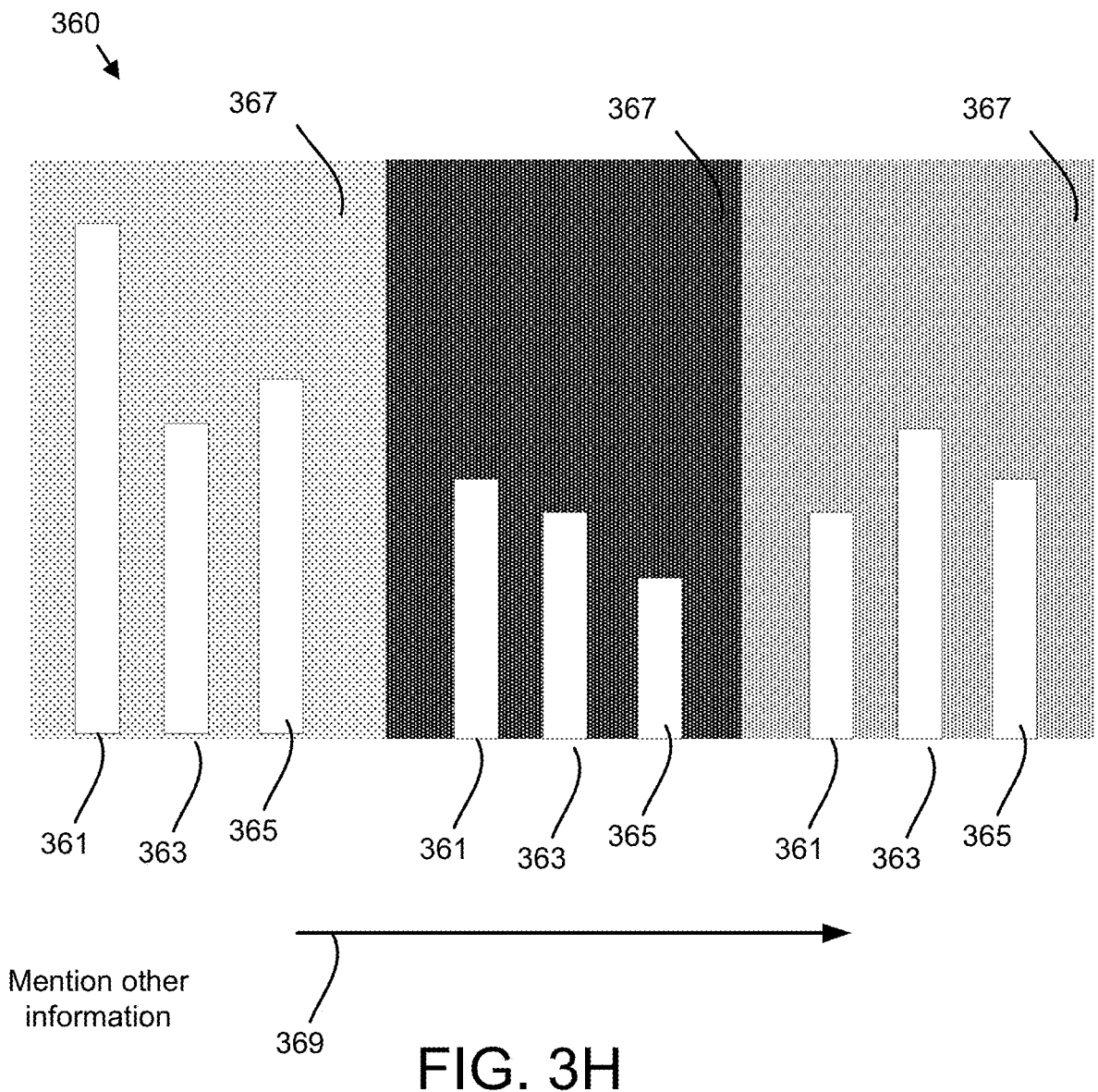
FIG. 3H is a drawing of a model health user interface according to an alternate embodiment.

FIG. 3H is a drawing of a model health user interface 360. Details of the model health 237 are shown for snapshots over time 369. In the depicted embodiment, each snapshot includes but is not limited to an image frequency 361, an inference frequency 363, and a label frequency 365. In one embodiment, an overall health 367 is presented as a color gradient background.

For example, the model health user interface 360 may show the number of images and detections with a color-gradient background, where green is healthy and red is unhealthy. Blue may indicate where no health metric is calculated, because of a lack of images or because the needed information has not been generated such as agreement metrics that require user-input, or model-health metrics that require a computer vision model 107 and/or model-generated image-features from the model backbone 111. The user may see an orange-red region and hovers over the points with their cursor to quickly view images from that time period versus other time periods. The user may see that the lighting difference is significance, indicating the user should label images 201 from the red region where this lighting is an issue. Images and/or animated gifs may be used to describe a gradient visualization.

Figure 3I:
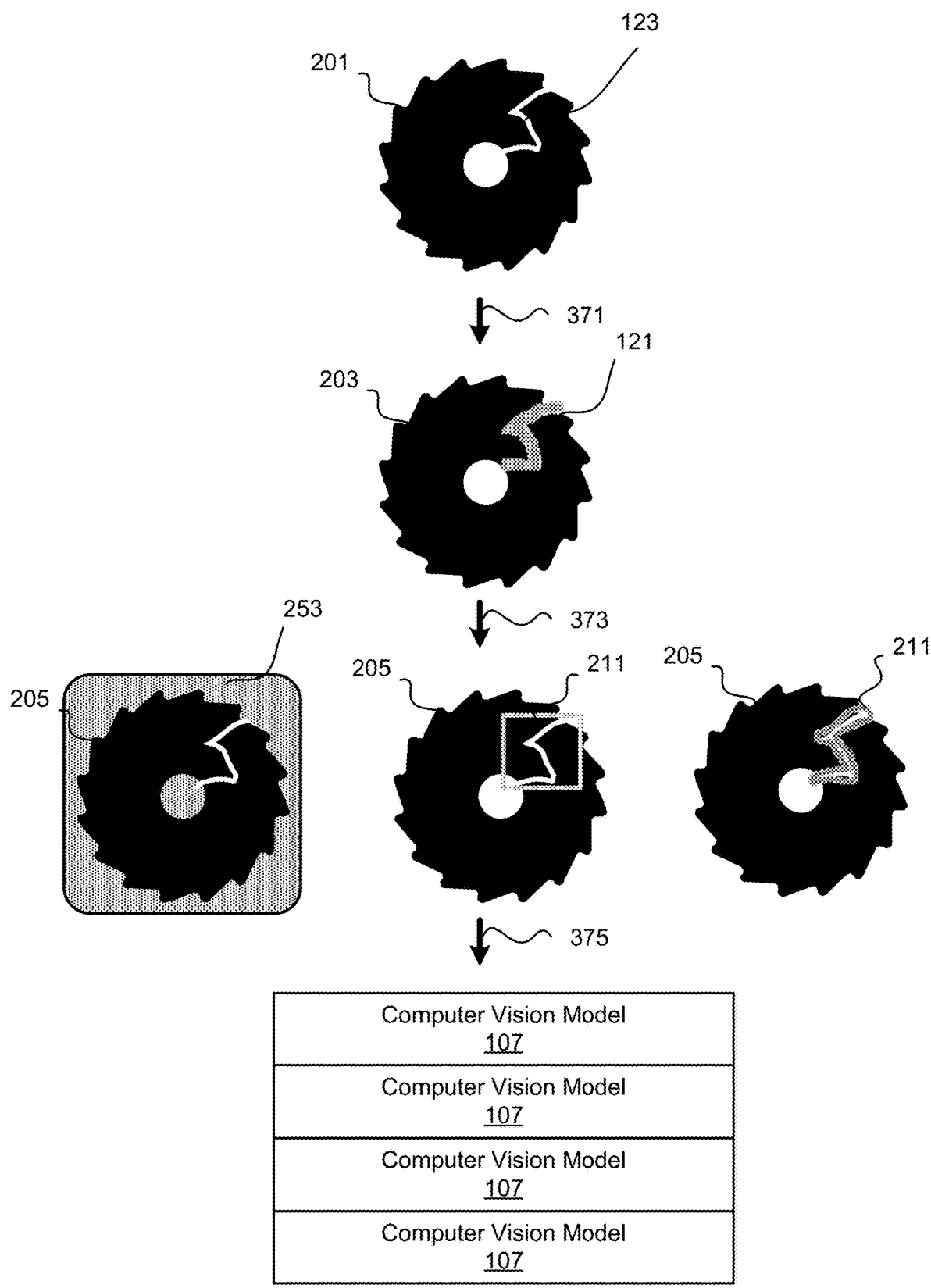
FIGS. 3I-K are drawings of a computer vision model update process according to an embodiment.
Figure 3J:
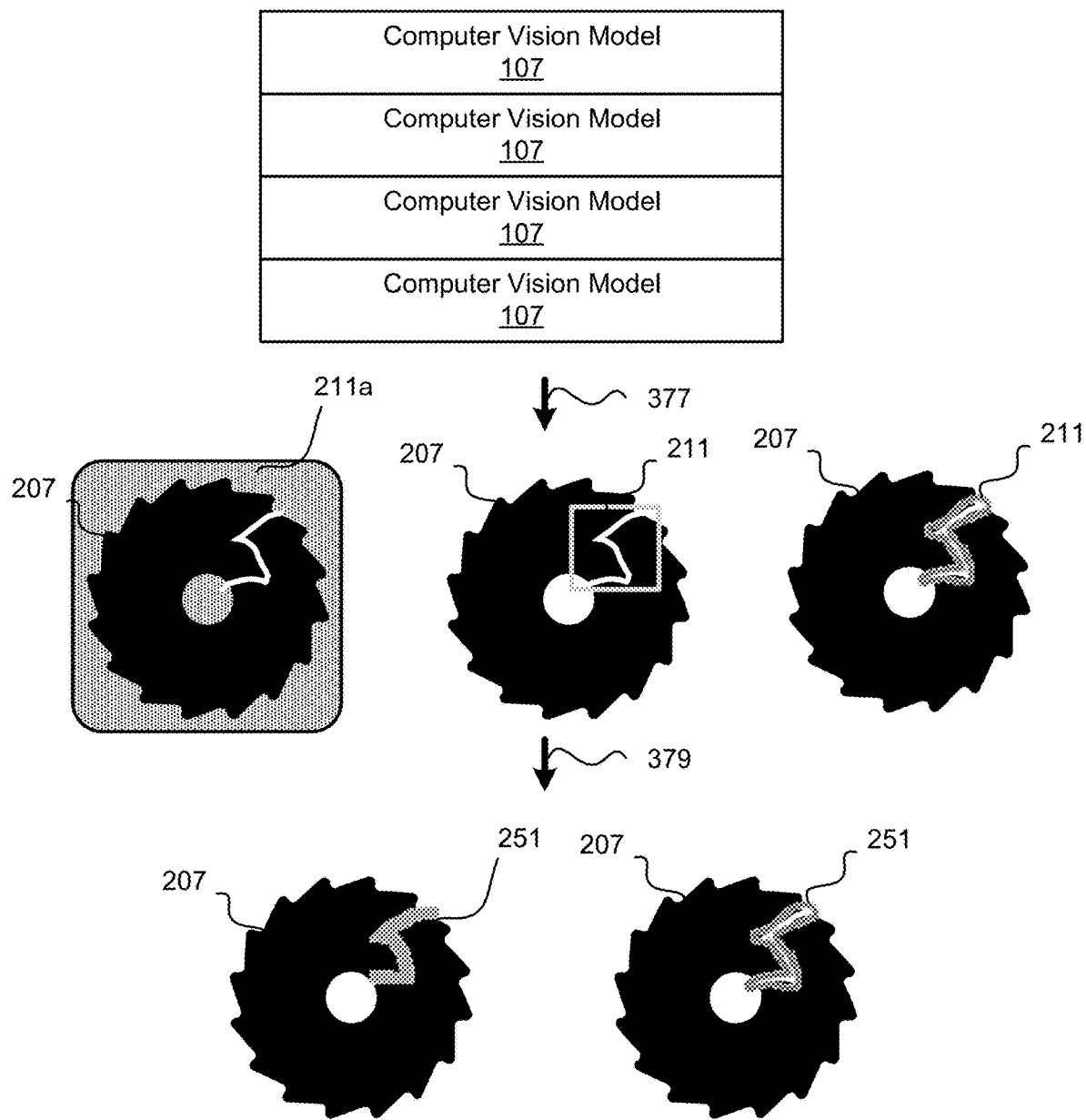
Figure 3K:
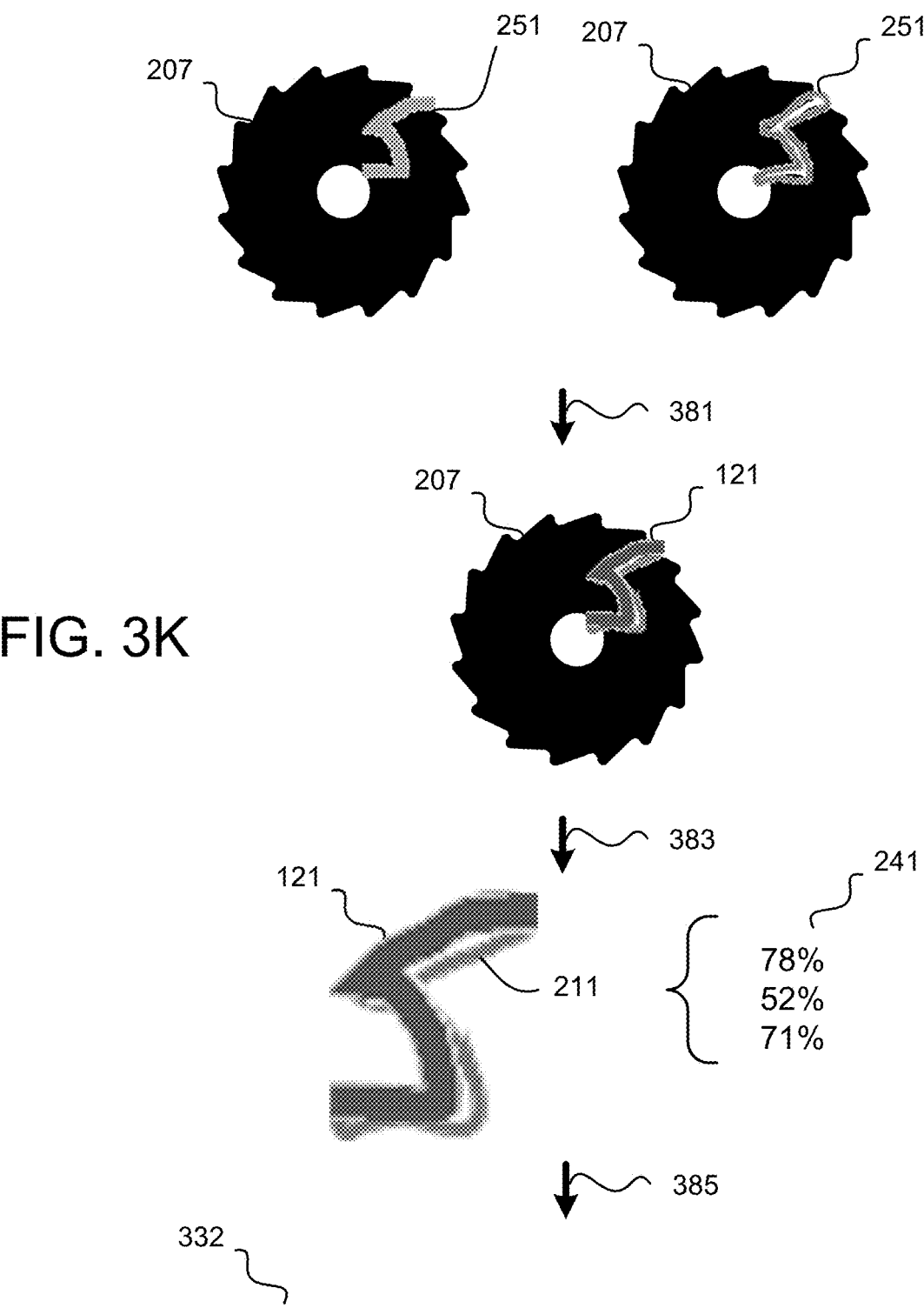

FIGS. 3I-3K are drawings of a computer vision model update process. In FIG. 3I, an image 201 may be presented to a user. The image 201 may have an image annotation 123. The user may annotate 371 the image 201 using the user interface 101 with a user annotation 121 to form a user input drawing 203. The user annotation 121 is a drawing created using a drawing interface in the user interface 101.

The user input drawing is converted 373 to a training format image 205. A training format image 205 may include a format suitable for training a target computer vision model 107, an image inference 211, or a clear indication 253 for marking when an image is void of any particular areas of interest. The training image 205 may be used to update 375 and/or train 375 at least one computer vision model 107.

In FIG. 3J, at least one computer vision model 107 generates 377 at least one training-representation drawing 207. A training-representation drawing 207 may include an image inference 211. The training-representation drawing 207 may be presented 379 to the user to receive user feedback 251. The user feedback 251 may be a drawing on the training-representation drawing 207.

In the depicted embodiment, an image inference 211*a* indicates that a training-representation drawing belongs to a specified class. The specified class may be defined by a user and/or administrator. In one embodiment, the specified class is automatically defined based on the image inferences 211.

In FIG. 3K, the user draws 381 a user annotation 121 on the training-representation drawing 207. The user annotation 121 may be user feedback 251. An agreement score 241 is calculated 383 between the image inference 211 and the user annotation 121. The agreement scores 241 may be used to generate 385 labeling advice 332 that is presented in the directions field 331.

Figure 4A:
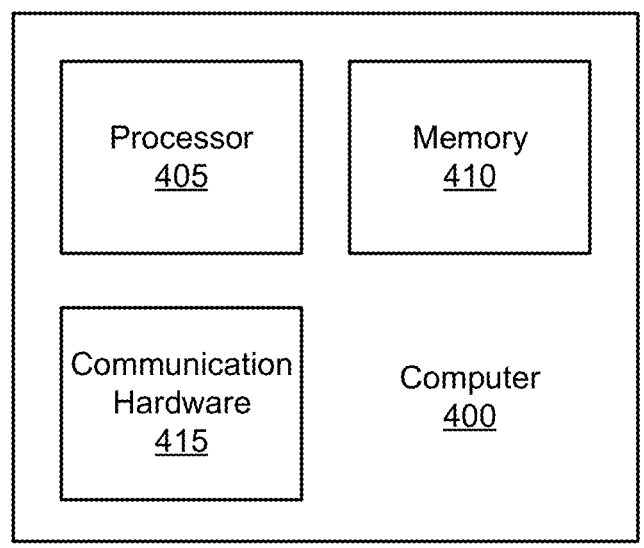
FIG. 4A is a schematic block diagram of computer according to an embodiment.

FIG. 4A is a schematic block diagram of computer 400. The computer 400 may be an edge device, a network device a server, and the like. In the depicted embodiment, the computer 400 includes a processor 405, memory 410, and communication hardware 415. The memory 410 stores code and data. The processor 405 executes the code and processes the data. The communication hardware 415 may communicate with other devices.

Figure 4B:
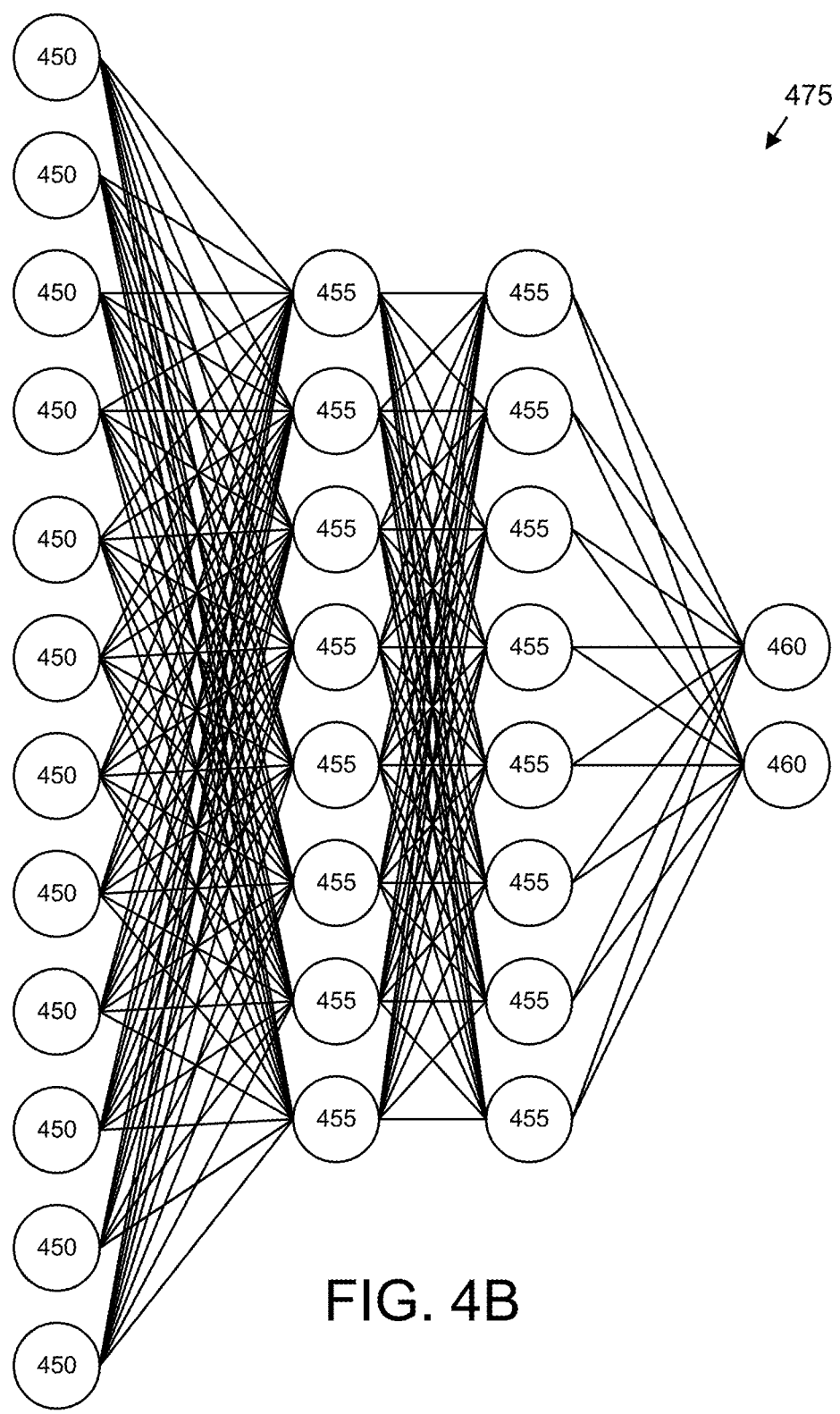
FIG. 4B is a schematic diagram of a neural network according to an embodiment.

FIG. 4B is a schematic diagram illustrating one embodiment of a neural network 475. In the depicted embodiment, the neural network 475 includes input neurons 450, hidden neurons 455, and output neurons 460. For simplicity, only a small number of input neurons 450, hidden neurons 455, and output neurons 460 are shown. The neural network 475 may be organized as a convolutional neural network, a recurrent neural network, RESNET, long short-term memory (LSTM) network, transformer network, and the like.

The neural network 475 may be trained with the training data 291, including images, labels, classifications, and the like. The neural network 475 may be trained using one or more learning functions while applying the training data 291 to the input neurons 450 and known result values for the output neurons 460. Subsequently, the neural network 475 may receive actual data at the input neurons 450 and make predictions at the output neurons 460 based on the actual data. The actual data may include images 201, and augmented forms of images. Augmented forms of images include but are not limited to rotation, perspective change, flipping along axis, change in brightness, change in contrast, adding blur, adding sections from multiple images to one image, and so forth. These image augmentations allow for a model more robust to changes in image-capturing environments.

Figure 5A:
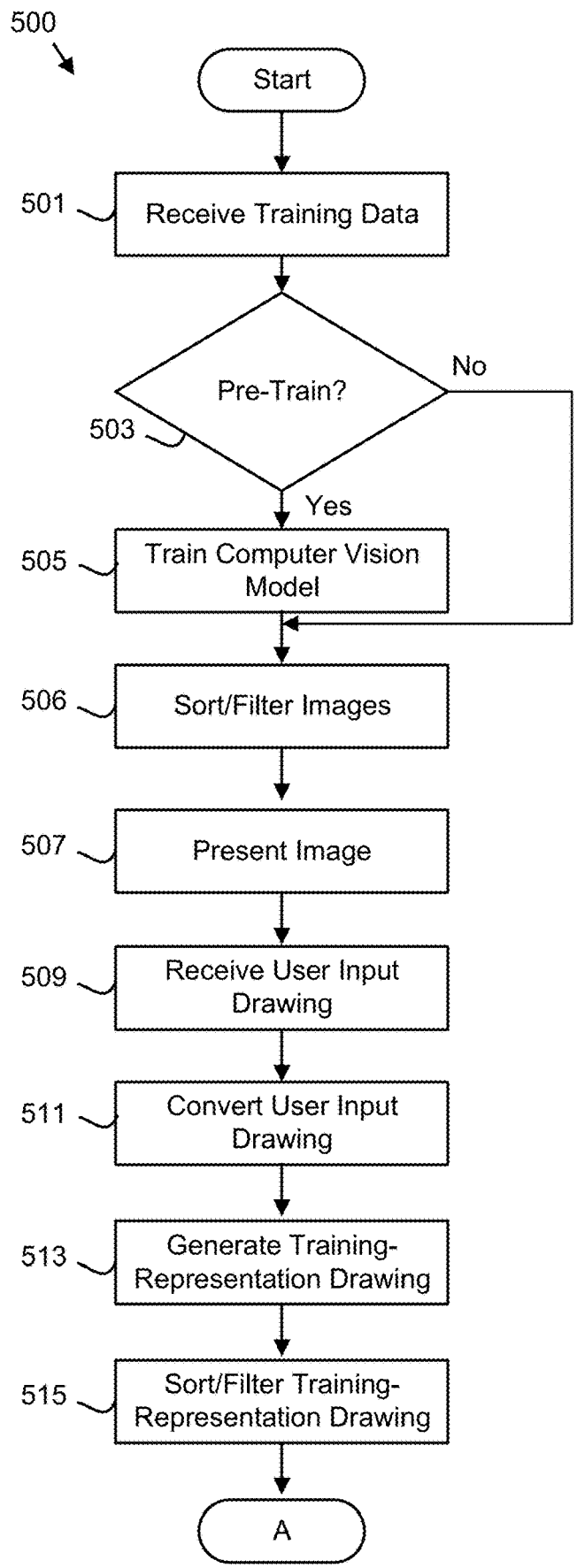
FIGS. 5A-B is a schematic flow chart diagram of a computer vision model update method according to an embodiment.
Figure 5B:
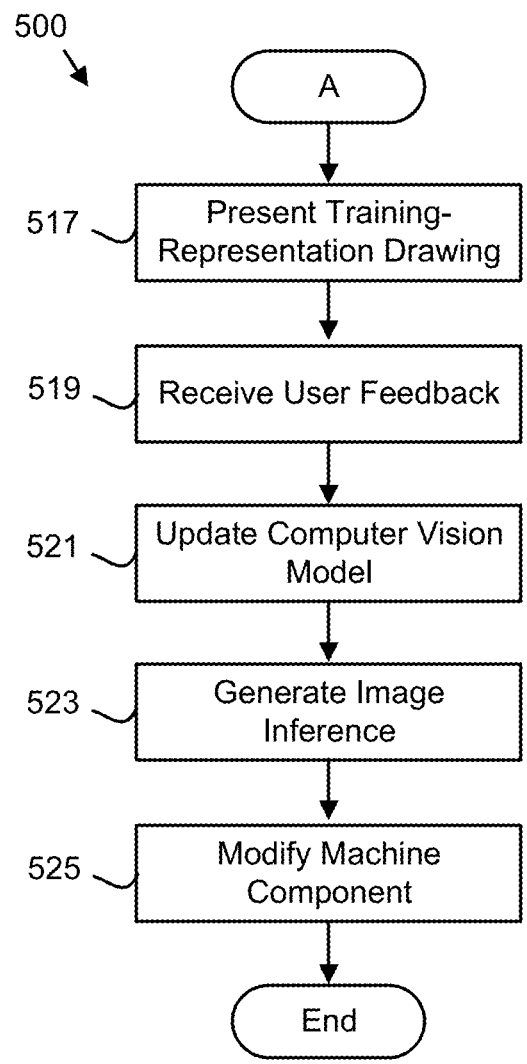

FIGS. 5A-B is a schematic flow chart diagram of a computer vision model update method 500. The method 500 may update the computer vision module 107 and generate an image inference 211 for an image 201. The method 500 may be performed by the computer vision system 100 and/or portions thereof such as a processor 405. For simplicity, the following steps will be described as performed by the processor 405. The method 500 may be performed on a single edge device computer 400 and/or a network of multiple computers 400. In one embodiment, the method 500 is only performed by an edge device.

The method 500 starts, and in one embodiment, the processor 405 receives 501 the training data 291. The training data may be without image inferences 211, user feedback 251, user annotations 121, and/or image annotations 123.

The processor 405 and/or the user may determine 503 whether to pre-train the computer vision model 107. If the computer vision model is pre-trained, the processor 405 trains 505 and/or pre-trains 505 the computer vision model 107 using the training data 291 with or without any annotation data. For example, the computer vision model 107 may be pre-trained without receiving user annotations 121.

The processor 405 may sort and/or filter 506 the images 201. In addition, the processor 405 may provide sorting and/or filtering features to the user via the user interface 101.

After uploading training data 291 to the system 100, the processor 405 may run a pre-training script to refine the computer vision model 107 to better match images 201 in many down-stream tasks such as anomaly detection, classification, object detection, segmentation. In addition, the processor 405 may present 507 images 201 and the user may start annotating the images 201 with user annotations 121 without the training/pre-training step 505 by using pre-configured model weights.

In one embodiment, after annotating just a few images 201, such as 5-10 images 201, the processor 405 may provide the image inference 211 and saliency maps 213 of the training-representation drawing data 208. This allows users to more-effectively understand what the computer vision model 107 is thinking/predicting while labeling and interacting with the computer vision model 107 using user annotations 121 rather than interacting with the computer vision model 107 post-hoc after large batches of annotation. This interactive form of annotation helps the computer vision model 107 become more informed over shorter periods of time, by having the human and computer collaboratively clarifying points of confusion.

In one embodiment, unsupervised learning is used to train the computer vision model 107 and/or model backbone 111. Transfer-learning may modify the network 'head' for inference (if larger number of annotated images 201). A meta-learning head may be used to conduct inference without a traditional neural network head (if smaller number of annotated images 201 or performance from meta-learning is sufficient).

If any training 505 is conducted on external computers 400, the model backbone 111 from that training 505 may be utilized to improve the on-device inference and training. As many of the tunable network parameters are in the model backbone 111, it may minimize training that cannot be done on an edge device computer 400. In one embodiment, no training is required off an edge device computer 400, and training only needs to be done once on an external computer 400 and may be repeated when model health 237 drops significantly.

In one embodiment, unlabeled images 201 are uploaded to the system 100. The model backbone 111 may be trained 505 by having a network and/or server distinguish unlabeled images 201 from augmented versions of the same images 201. Existing neural network weights, like open-source weights, may be used via transfer-learning to speed this process up, such as up to 100-200 epochs.

In one embodiment, before images 201 are annotated, the system 100 and/or processor 405 runs a pre-trained model backbone 111 or open-source weight model backbone 111 against all images 201 on the system 100, saving all activations from network.

The processor 405 may present 507 at least one image 201 to the user via the user interface 300. The user may employ the model user interface 300 to add a user annotation 121 to the at least one image 201 in the drawing format 209 to form a user input drawing 203. The processor 405 may receive 509 the user input drawing 203.

The processor 405 may convert 511 the user input drawing 203 to the training format image 205 in the training format 275 for the computer vision model 107 and/or model backbone 111. In one embodiment, after a user annotates a small number, such as in the range of 5-10, of images 201 such as by marking them all with activations such as a clear indication 253 and/or a user annotation 121. The processor 405 may run all clear indications 253 and/or user annotations 121 against a statistical model creating an image inference 211 of each image 201 in relation to images 201, such as feedback information 220 indicating dissimilarity from group of empty images 201 and additionally generate saliency maps 213 or segments of the image 201 to render in the future. In one embodiment, this process requires no graphics processor unit (GPU) or less significant GPU usage as the model backbone 111 features are pre-calculated.

The processor 405 may generate 513, with the computer vision model 107, a training-representation drawing 207 from the training format image 205. The training-representation drawing 207 may comprise an image inference 211 for the first image 201. Training-representation drawings 207 may be generated 513 for a plurality images 201.

The processor 405 may sort and/or filter 515 at least two training-representation drawings 207. The sorting 515 may be informed by the user input drawings 203 including during generation of saliency maps 213. The sorting and filtering 515 may also be based on user feedback 251 and/or feedback information 220. The sorting 515 may generate a sortable image index to explain image inferences with respect to a guided user annotation 121 of a second image 201.

In one embodiment, after a portion of this sorting process is completed, a user may sort by feedback information 220 and apply other filters, then start drawing user annotations 121 on images 201 to annotate or debug the computer vision model 107. As a user is drawing, image inferences 211 and other information are calculated and shown in near-immediate time as the image inferences 211 are pre-calculated. AI-assisting drawing tools using the pre-generated image inferences 211 will be made available to help more quickly draw, for example using a click-and-drag box selection tool which finds parts of the machine inference-image that include a segment within that box to draw an initial best-guess.

The processor 405 may present 517 the training-representation drawings 207 to the user via the model user interface 300. The processor 405 may further receive 519 user feedback 251 for the training-representation drawing 207. The user feedback to 51 may be received in the drawing format 209.

The processor 405 may update 521 the computer vision module 107 based on the user feedback 251. The computer vision model 107 may be updated with training data 291 comprising images 201 and corresponding image inferences 211 and user feedback 251. In addition, the computer vision model 107 may be updated with training data 291 comprising images 201 and corresponding image inferences 211 that incorporate user feedback 251.

In one embodiment, training data 291 are automatically added or changed based on the number of available user-annotated user input drawings 203, but can be manually set per classification-type, such as drawing color. Users may have the option to bootstrap training of some computer vision models 107 by using auto-labeling approaches during this process. If the training data 291 for the computer vision models 107 to be trained on edge device computer 400 exceeds the capacity of the edge device computer 400, users may send the training data 291 to an external training device such as a server for more high-performance training with optional auto-labeling. If this external training is conducted, and the results are verified by a user, the processor 405 may deploy the computer vision model 107 in one or more computer vision systems 100.

The processor 405 may generate 523 an image inference 211 for a second image 201 based on the updated computer vision model 107. In one embodiment, the processor 405 caches partial results from image inferences 211 (e.g. backbone-generated features) to afford quicker updating of computer vision models 107. In addition, the processor 405 may modify 525 a machine component based on the image inference 211 for the second image 201 and the method 500 ends. For example, the processor 405 may change a cutter based on the image inference 211.

Figure 5C:
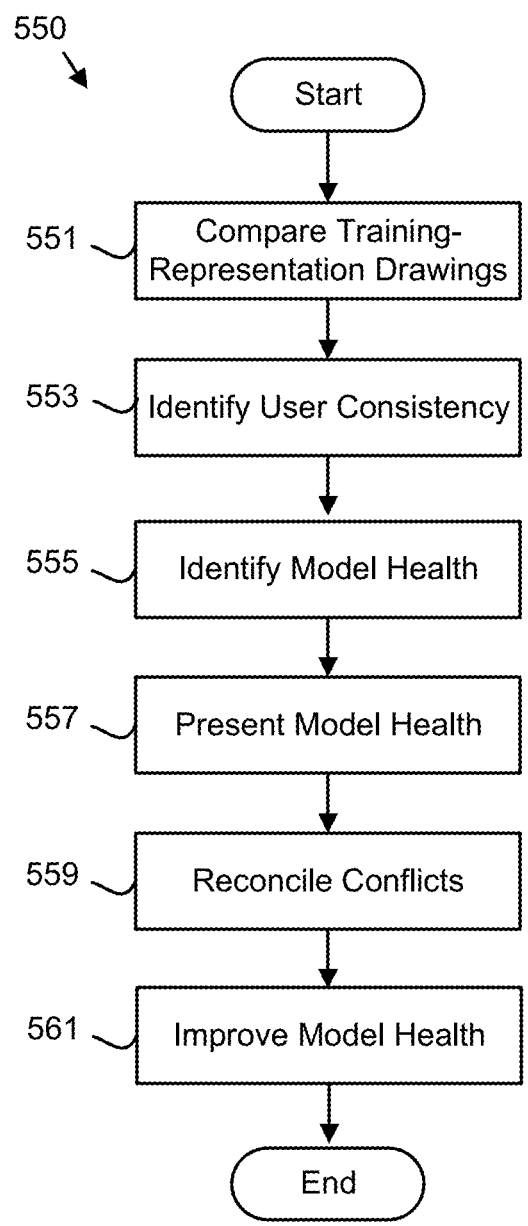
FIG. 5C is a schematic flow chart diagram of a model health improvement method according to an embodiment.

FIG. 5C is a schematic flow chart diagram of a model health improvement method 550. The method 550 may improve the model health 237 of the computer vision model 107. The method 550 may be performed by the computer vision system 100 or portions thereof including a processor 405. The method 550 may be performed on a single edge device computer 400 and/or a network of multiple computers 400.

In one embodiment, the processor 405 compares 551 at least two sets of training-representation drawings 207, user input drawings 203, and/or corresponding feedback information 220. The processor 405 may identify 553 the user consistency 239 from the comparison 245.

The processor 405 may identify 555 the model health 237 from the comparison 245. Model health 237 may be calculated by using statistical tests comparing the distribution of pre-computed activations/features from user input drawings 203 to distributions of pre-computed activations/features from a group of incoming images 201. In one embodiment, this does not require a GPU. A GPU may only be needed for training the model backbone 111, inferring with a model backbone 111 (once per image for the most-recent updated backbone), and during inference if there is a neural network 475.

The processor 405 may present 557 the model health 237 via the model user interface 300 such as illustrated in FIG. 3H. In one embodiment, the processor 405 reconciles 559 conflicts between the at least two sets of training-representation drawings 207, user input drawings 203, and/or corresponding feedback information 220.

Comparisons 245 can be utilized to consolidate or reconcile conflicting information between users and/or computer vision modules 107, including for user consistency 239. End goals for both improving model health 247/user consistency 239, and enlightening users of emergent points of confusion among humans so that more formal and more consistent definitions of how to mark user annotations 121 can be created which in turn should also improve the computer vision model 107.

In one embodiment, the reconciled conflicts are presented to the user. The reconciled conflicts may inform the user on techniques, tactics, and/or strategies for applying user annotations 121 to the user input drawings 203. The processor 405 may improve 561 the model health 237 to the target model health range 243 by reconciling 559 the conflicts.

After the computer vision model 107 reaches satisfactory performance, the computer vision system 100 can be run for a longer period of time without much supervision. If model health 237 crosses a threshold, a user may label and/or annotate more images where model health 237 was poor using interactive tools mentioned above to debug why models made mistakes, retrain the existing computer vision model 107 using the last methodology, and then change training methodology for users if needed. During all of the above, a manager can view and review annotations from all users and make changes to the training methodology. The manager will be the main point of contact to change device customization and helping configure how model output relates/maps to programmable logic controller (PLC) values.

To verify model-performance, pruning and quantization may be verified by the user to make sure the speed-accuracy tradeoff is good. To verify the speed-accuracy performance, annotations may be used as this varies per application/dataset. This creates a chicken-and-egg problem, where pruning could make the process faster but to evaluate that the system still works, we need the output of the pruned system. Because of this, pruning and/or quantization could optionally be done around step 561 when the model is about at satisfactory performance. The method 550 could make the option available as soon as right before step 555, but making it clear there are risks with pre-maturely optimizing speed before knowing the objective of the system.

Figure 5D:
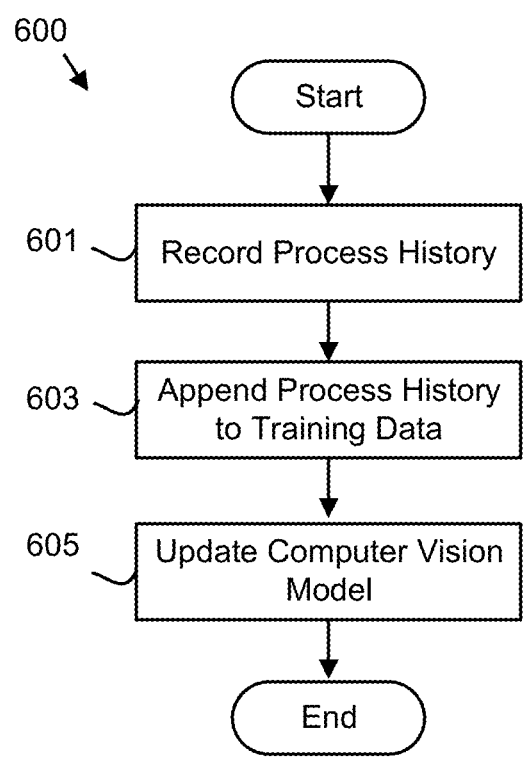
FIG. 5D is a schematic flow chart diagram of an alternate computer vision model update method according to an embodiment.

FIG. 5D is a schematic flow chart diagram of an alternate computer vision model update method 600. The method 600 may update the computer vision model 107. The method 600 may be performed by the computer vision system 100 and/or portions thereof including the processor 405. The method 600 may be performed on a single edge device computer 400 and/or a network of multiple computers 400.

The method 600 starts, and in one embodiment, the processor 405 records 601 the process history 293. The process history 293 may include process information 295, images 201, and/or corresponding image inferences 211. The process history 293 may be recorded 601 for at least one user. In addition, the process history 293 may be shared between computer vision systems 100.

In one embodiment, the processor 405 appends 603 the process history 293 to the training data 291. The processor 405 may update 605 the computer vision model 107 with the training data 291 and the method 600 ends.

Figure 5E:
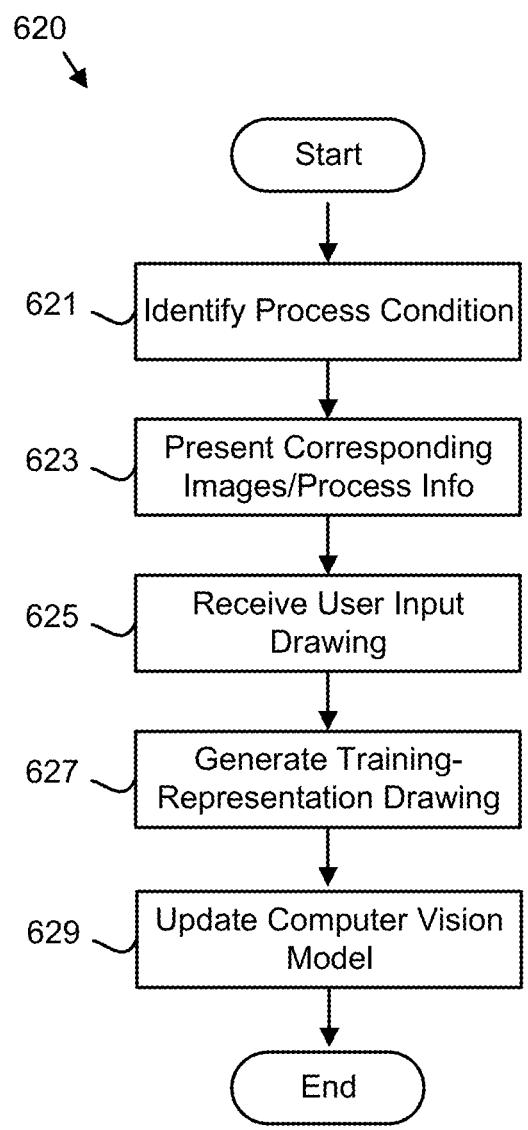
FIG. 5E is a schematic flow chart diagram of an alternate computer vision model update method according to an embodiment.

FIG. 5E is a schematic flow chart diagram of an alternate computer vision model update method according to an embodiment. The method 600 may be performed by the computer vision system 100 and/or portions thereof including the processor 405. The method 650 may be performed on a single edge device computer 400 and/or a network of multiple computers 400.

The method 620 starts, and in one embodiment, the processor 405 identifies 621 a process condition 247. The process condition 247 may be a failure condition, a part characteristic, an operational characteristic, a part failure characteristic, and the like.

The processor 405 may present 623 a second image 201 and/or process information 295 corresponding to the process condition 247. The second image 201 may have a similar failure condition, part characteristic, operational characteristic, part failure characteristic, or the like.

The processor 405 may receive a user input drawing 203 comprising the user annotation 121 of the second image 201. The processor 405 may generate 627 a training-representation drawing 207 from a training format image 205 of the user input drawing 203. In addition, the processor 405 may update the computer vision model 107 with the training-representation drawing 207 and the method 620 ends.

Problem/Solution

Computer vision models 107 can be difficult to understand and maintain. Many of the decisions made by the computer vision models 107 are implemented by neural networks 450 that are difficult to inspect or update in a timely manner without experienced computer vision practitioners. Additionally, tools made to help novice users to setup, label, train, evaluate, optimize, monitor, and maintain computer vision systems tend to be disconnected, requiring Information Technology specialists to setup and interconnect.

The embodiments described herein provide an intuitive and wholistic feedback/training mechanism for computer vision models 107. The embodiments allow a user to provide feedback via a user input drawing 203 with a user annotation 121. The user input drawing 203 is converted to a training format image 205 that may be used to train and/or update the computer vision model 107. In addition, the embodiments generate a training-representation drawing 207 from the training format image 205. The training-representation drawing 207 may be presented to the user and user feedback 251 received from the user. The computer vision model 107 may be updated based on the user feedback 251. As a result, the computer vision model 107 may be easily maintained, and updated.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
converting, by use of processor, a user input drawing comprising a user annotation of a first image in a drawing format to a training format image in a training format for a computer vision model;
generating, with the computer vision model, a training-representation drawing from the training format image, the training-representation drawing comprising an image inference for the first image;
receiving user feedback for the training-representation drawing in the drawing format;
updating the computer vision model based on the user feedback; and
generating an image inference for a second image based on the updated computer vision model.

2. The method of claim 1, wherein the image inference comprises a pixel map agreement metric that highlights commonly marked and differently marked pixels in the user annotation and image annotations, a pixel percentage metric that compares the commonly marked and differently marked pixels in the user annotation and image annotations, and a comparison heatmap metric that shows the sums of the commonly marked and differently marked pixels over regions.

3. The method of claim 1, wherein the method further comprises:
receiving training data;
pre-training the computer vision model;
receiving the user input drawing;
sorting at least two training-representation drawings;
presenting the training-representation drawing; and
modifying a machine component based on the image inference for the second image.

4. The method of claim 3, wherein the computer vision model is pre-training using transfer learning and/or meta learning.

5. The method of claim 1, wherein the method further comprises:
comparing at least two sets of training-representation drawings, user input drawings, and/or corresponding feedback information;
identifying a user consistency from the comparison;
identifying a model health from the comparison;
reconciling conflicts between the at least two sets of training-representation drawings, user input drawings, and/or corresponding feedback information; and
improving the model health to a target model health range.

6. The method of claim 5, wherein the model health is presented as a user interface that indicates image frequency, inference frequency, label frequency, and/or overall health.

7. The method of claim 6, wherein the overall health is presented as a color gradient background.

8. The method of claim 1, wherein the drawing format is selected from the group consisting of a bounding box, a mask, and selected pixels.

9. The method of claim 1, the method further comprising:
recording a process history comprising process information, images, and corresponding image inferences;
appending the process history to the training data; and
updating the computer vision model with the training data.

10. The method of claim 1, the method further comprising:
identifying a process condition;
presenting a second image and process information corresponding to the process condition; and
updating the computer vision model from a second user annotation of the second image.

11. The method of claim 1, the training-representation drawing further comprising a saliency map indicating areas of the first image that influenced the model inference.

12. The method of claim 1, the training-representation drawing further comprising feedback information comprising a coverage agreement, an intersection over union (IoU) coverage, a saliency coverage, a ground truth coverage, a shared focus area, a divergent focus area, a confusion area, and a suggestion.

13. The method of claim 1, wherein the user feedback comprises an agreement indication, an annotation bounding box, annotation pixels, annotation colors, and/or annotation layers.

14. The method of claim 1, wherein the computer vision model is updated with training data comprising images and corresponding image inferences and user feedback.

15. The method of claim 1, wherein the computer vision model is updated with training data comprising images and corresponding image inferences that incorporate user feedback.

16. An apparatus comprising:
a processor executing code stored on a memory to perform:
converting a user input drawing comprising a user annotation of a first image in a drawing format to a training format image in a training format for a computer vision model;
generating, with the computer vision model, a training-representation drawing from the training format image, the training-representation drawing comprising an image inference for the first image;
receiving user feedback for the training-representation drawing in the drawing format;
updating the computer vision model based on the user feedback; and
generating an image inference for a second image based on the updated computer vision model.

17. The apparatus of claim 16, wherein the image inference comprises a pixel map agreement metric that highlights commonly marked and differently marked pixels in the user annotation and image annotations, a pixel percentage metric that compares the commonly marked and differently marked pixels in the user annotation and image annotations, and a comparison heatmap metric that shows the sums of the commonly marked and differently marked pixels over regions.

18. The apparatus of claim 16, wherein the processor further performs:
receiving training data;
pre-training the computer vision model;
receiving the user input drawing;
sorting at least two training-representation drawings;
presenting the training-representation drawing; and
modifying a machine component based on the image inference for the second image.

19. The apparatus of claim 18, wherein the computer vision model is pre-training using transfer learning and/or meta learning.

20. A computer program product, the computer program product comprising a non-transitory computer readable storage medium having program code embodied therein, the program code readable/executable by a processor to:

converting a user input drawing comprising a user annotation of a first image in a drawing format to a training format image in a training format for a computer vision model;

generating, with the computer vision model, a training-representation drawing from the training format image, the training-representation drawing comprising an image inference for the first image;

receiving user feedback for the training-representation drawing in the drawing format;

updating the computer vision model based on the user feedback; and generating an image inference for a second image based on the updated computer vision model.

\* \* \* \* \*